(No Model.)
W. B. MILLER.
FARM GATE.
No. 486,289. Patented Nov. 15, 1892.
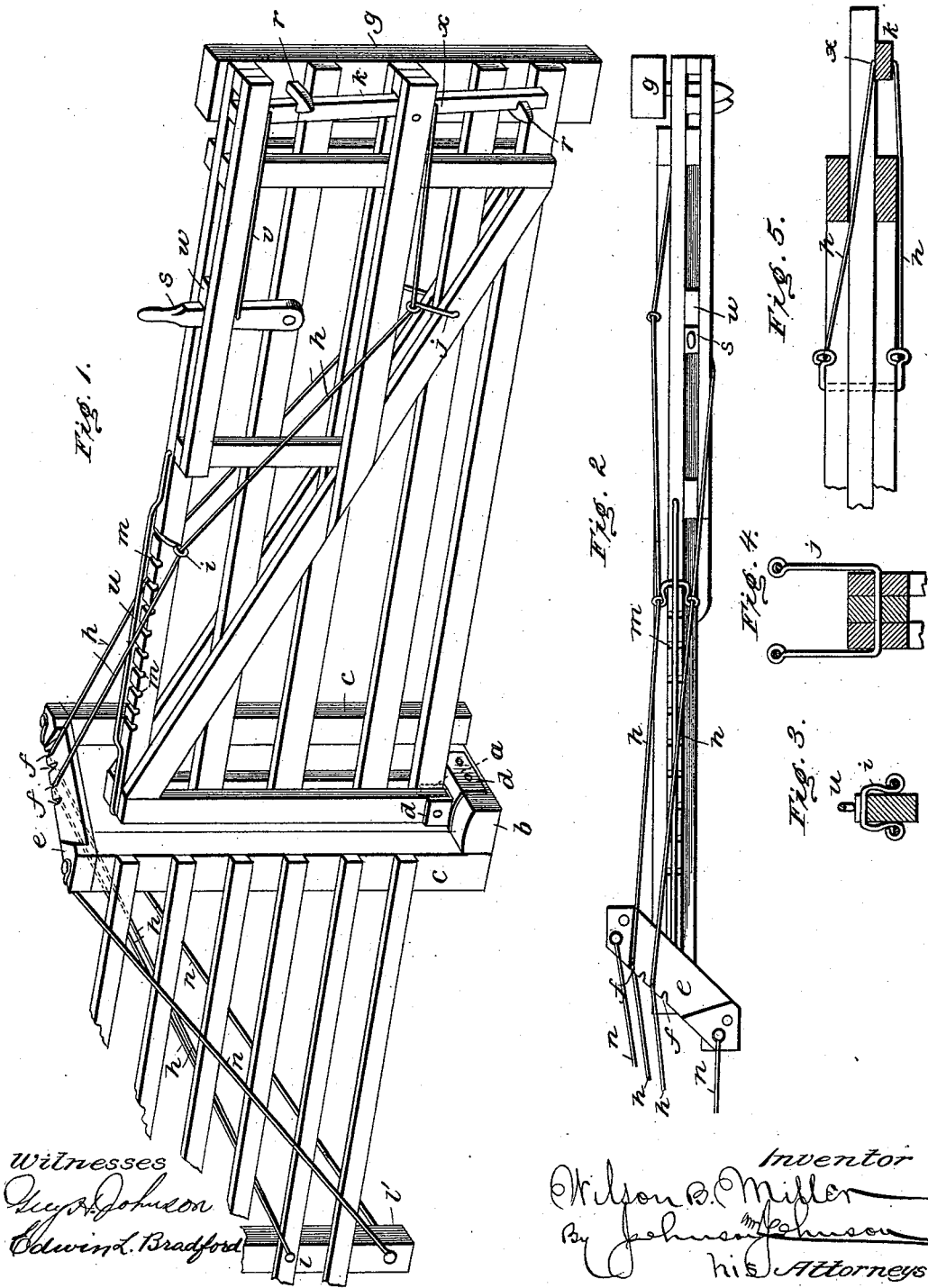

UNITED STATES PATENT OFFICE.

WILSON B. MILLER, OF ROUND ROCK, TEXAS.

FARM-GATE.

SPECIFICATION forming part of Letters Patent No. 486,289, dated November 15, 1892.

Application filed August 6, 1892. Serial No. 442,384. (No model.)

*To all whom it may concern:*

Be it known that I, WILSON B. MILLER, a citizen of the United States, residing at Round Rock, in the county of Williamson and State of Texas, have invented certain new and useful Improvements in Farm-Gates, of which the following is a specification.

My invention relates to self-closing swinging farm-gates, and the particular improvements which I have made are directed to a novel construction whereby a double latch-bar is rendered self-latching by the weight and self-closing of the gate, and to provision for properly suspending the gate upon a single bottom pivot at the fence-post, whereby the durability and usefulness of the gate are increased, in connection with wires by which the gate is both suspended and rendered self-closing, as illustrated in the accompanying drawings, in which—

Figure 1 is a perspective view of a self-closing swinging gate embodying my improvements. Fig. 2 shows a top view of the gate closed. Fig. 3 is a cross-section of the notched top bar, showing the adjustable yoke for the wires which suspend the gate. Fig. 4 shows the gate-suspending yoke in the lower bar, and Fig. 5 shows the loop connection of the gate-suspending wire with the latch-bar and the lower gate-yoke.

The gate is mounted and swings to open and close upon a bottom pivot $a$ at its inner end. This pivot is fixed in a foundation-block $b$, which stands crosswise of the line of the fence. Two posts $c\ c$ are placed one on each side of this block and standing on opposite sides of the inner end of the gate in a diagonal relation to each other and to the gate when closed, and between these posts the inner end of the gate swings and is held in position upon the bottom pivot. The block and the lower end of the gate-bar have metal straps $d\ d$ to form the bearing-surface. At the top above the gate these posts are connected by a cap-bar $e$, which crosses diagonally over the pivoted end of the gate and has notches $f$ on its upper side. The gate is constructed and braced in any suitable way and has the usual latch-post $g$. The gate is both suspended and supported upon its bottom pivot by wires $h\ h$, one on each side of the gate, which pass over and engage the notches in the diagonal cap. These wires are sufficiently strong to sustain the weight of the swinging end of the gate, down each side of which they pass from the said notched cap through eyes of suspending-yokes $i\ j$ in the upper and in the lower bars of the gate, and are connected to the opposite sides of a vertical latch-bar $k$ at the swinging end of the gate. The other ends of these suspending-wires may be extended beyond the notched cap and fastened to one of the fence-posts or to a firmly-anchored stake $l$ for the purpose of preventing the cap-connected posts from being pulled over by the weight and swinging of the gate. This anchoring of the wires sustains the pulling action of the gate on the cap-connected posts, prevents the latter from leaning under the suspending action of the wires, and keeps the gate in proper relation to the latch-post. The suspending-yokes are of strong wire, and the upper one $i$ is placed in notches $m$ in the top gate-bar, so that its eyed ends hang down and support the wires on each side of said bar. The lower yoke $j$ is confined in the gate-bar and its eyed ends stand upward on each side of the gate, and through these eyes the wires pass to the latch-bar. The latch-bar $k$ is pivoted in the middle of its length to a middle bar of the gate, so as to engage a catch $r$ both at its upper and at its lower end, and for this purpose these catches are fixed in the post, so that the upper one may engage the outer and the lower one the inner edge of the latch-bar. This double latch serves to fasten the gate at its top and at its bottom, so that it is better supported against winds and cattle when closed. It will be seen that the suspending-wires are connected to the latch-bar below its pivot and that therefore the suspending function of the wires is constantly exerted to keep the latch-bar engaged when the gate is closed and to allow the latch-bar to engage the catches and to be disengaged from them. As the wires sustain the swinging end of the gate, they are always kept taut, and in unlatching the bar its pull upon the wires is resisted by the weight of the swinging end of the gate. To unlatch the gate against its weight, I provide a lever $s$, pivoted to the gate standing upward above the top bar and connected to the upper end of the latch-bar by wires $v$, so that pulling back the lever disengages the latch-bar. A stop $w$ serves to support the lever in position, allow the engagement of the latch-bar, and to relieve the weight of the gate from being borne by the catches, which would be the case if the latch-bar supported the weight of the gate against the catches. I prefer to use a single strong suspending-wire passing through the eyes of the yokes, through an eye $x$ of the latch-bar, and anchored at its ends, as stated, so that in opening the gate the tension of the wire will be equal on both sides of the gate, because of the free loop connection of the wire with the latch-bar, and also by reason of passing freely through the eyes of the suspending-yokes and of the freedom of the latter to move with the drawing action of the wires. While the notches in the diagonal cap serve to engage and retain the suspending-wires thereon, they also serve to allow the wires to be adjusted to change their angle in relation to the gate, and this relation of the wires to the gate is what causes them to exert a lateral force upon the gate to cause it to close automatically when opened. For this purpose the wires are set in the notches above the closing side of the gate. The notches $m$ in the top gate-bar provide for setting the wire-suspending yoke nearer to or farther from the pivoted end of the gate, and thereby take up any sagging which may take place in the swinging end of the gate, because such movement of the yoke will so change the angle of the suspension-wires in relation to the gate as to raise or lower its latch end, and thereby take up any sagging of the gate. A rod $u$ is fastened to the upper gate-bar over the notched part to prevent the stock gnawing away this part of the gate. The gate can be erected on uneven ground and stand up or down grade, and it can be made from ten to sixteen feet wide, which is important for the passage of reaping and mowing machines and hay loads. To counteract any tendency of the weight of the gate to pull the posts over by the wires $h$, I may use supplemental wires $n\ n$, anchored to one of the fence-posts at $l'$, and connect them to the post-cap, as shown, and thus support the posts $c\ c$ against the pull of the suspension-wires.

I claim as my improvements in farm-gates—

1. The combination, with a gate pivoted on its lower inner end, of a suspending-wire passing freely through the latch-bar, through the free ends of yokes on each side of the gate, over a cap-post above the pivoted end of the gate, and anchored some distance from and independent of said post-cap, substantially as described, and for the purpose stated.

2. The combination, with a gate pivoted to swing on its lower inner end and posts having a cap crossing the gate above its pivoted end, of a suspending-wire for the gate, having a free bearing upon the post-cap, anchored in the line of the fence some distance from and independent of said post-cap, and supporting the gate in the way, substantially as described.

3. The combination, with a gate pivoted to swing on its lower inner end, posts having a cap crossing the gate above its pivoted end, and a latch-post having a catch near each end, the two catches standing in reverse relation to each other, of a gate latch-bar pivoted in the middle of its length and a suspending-wire for the gate, having a free bearing upon the post-cap, anchored in the line of the fence some distance from and independent of said post-cap and passed through the latch-bar, substantially as described.

4. The combination, with a gate pivoted to swing on its lower inner end, posts having a cap crossing the gate above its pivoted end, and a latch-post having a catch near each end, the two catches standing in reverse relation to each other, of a gate latch-bar pivoted in the middle of its length, a suspending-wire for the gate, anchored in the line of the fence some distance away from the pivoted end of the gate, having a free bearing upon said post-cap and passed through the latch-bar, and yokes, one hanging down and one standing up, in the upper and lower bars of the gate to engage the wire at both sides of the gate, substantially as described.

5. The combination, with a gate pivoted to swing on its lower inner end, a latch-post having a catch near each end, the two catches standing in reverse relation to each other, and a gate latch-bar pivoted in the middle of its length, of a suspending-wire for the gate, anchored in the line of the fence some distance away from the pivoted end of the gate, supported upon posts over said pivoted end, passed through the latch-bar, yokes, one hanging down and one standing up in the upper and lower gate-bars, engaging the wire at both sides of the gate, a lever pivoted in the upper bars of the gate, having a wire connection with the upper end of the latch-bar, and a stop for limiting the pressure of the latch-bar upon the post-catches, substantially as described.

6. The combination of the gate and the suspending-wire supported on the post-cap and anchored independent of said cap with supplemental wires connected to said cap and anchored, as described.

In testimony whereof I have hereunto signed this specification in the presence of two witnesses.

WILSON B. MILLER.

Witnesses:
L. T. MAYS,
J. M. JARRELL.